(12) United States Patent
Machacek

(10) Patent No.: US 6,616,881 B2
(45) Date of Patent: Sep. 9, 2003

(54) METHOD OF TREATING ZIPPER TO REMOVE CAMBER

(75) Inventor: Zdenek Machacek, Nanuet, NY (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/777,949

(22) Filed: Feb. 6, 2001

(65) Prior Publication Data

US 2002/0117779 A1 Aug. 29, 2002

(51) Int. Cl.⁷ .......................... B29C 53/16; B29C 55/06
(52) U.S. Cl. .................. 264/280; 264/288.4; 264/288.8
(58) Field of Search .............................. 264/280, 288.4, 264/288.8

(56) References Cited

U.S. PATENT DOCUMENTS 5,024,537 A * 6/1991 Tilman ........................ 383/63

* cited by examiner

Primary Examiner—Leo B. Tentoni
(74) Attorney, Agent, or Firm—Pitney, Hardin, Kipp & Szuch LLP

(57) ABSTRACT

A method and apparatus for removing camber from zipper with profiles having interlocking elements and or webs. The zipper is stretched longitudinally in a manner so that the interlocking elements stretch relative to each other. To this end, the zipper is fed to an idler wheel that may be spring loaded. From a set of first drive wheels and fed from the idler wheel by a set of second drive wheels. The second drive wheels are driven faster than the first drive wheels to effect the stretching. Alternately only the second set of drive wheels are driven and the stretch is provided by the spring loaded idler wheel or the zipper is driven around a static curved surface.

10 Claims, 3 Drawing Sheets

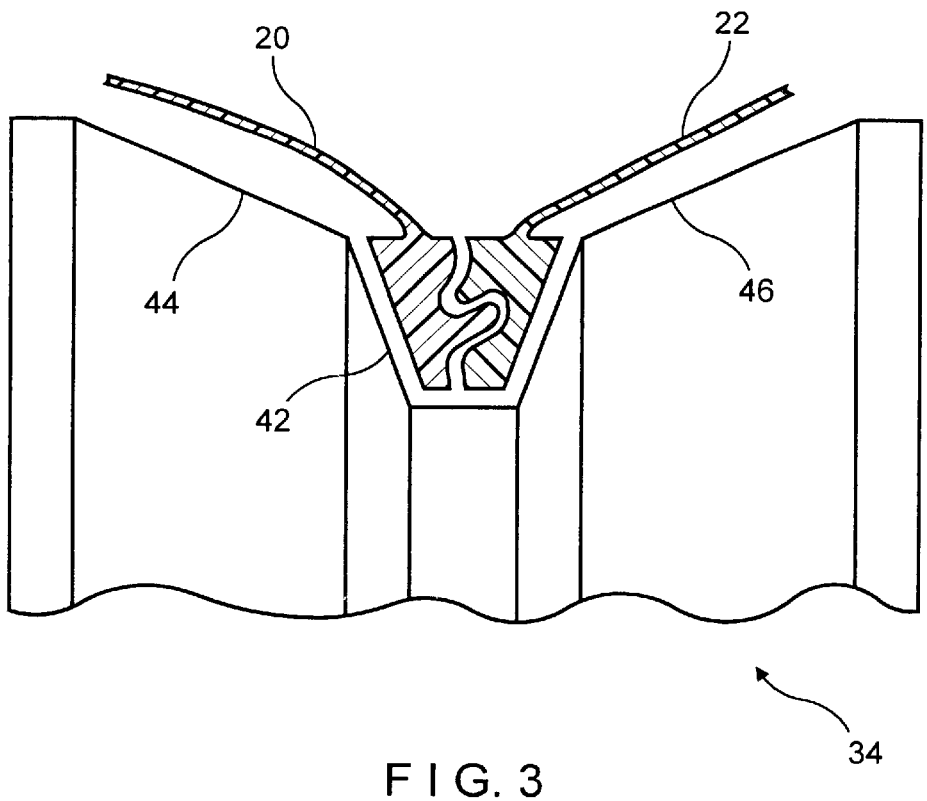
F I G. 3
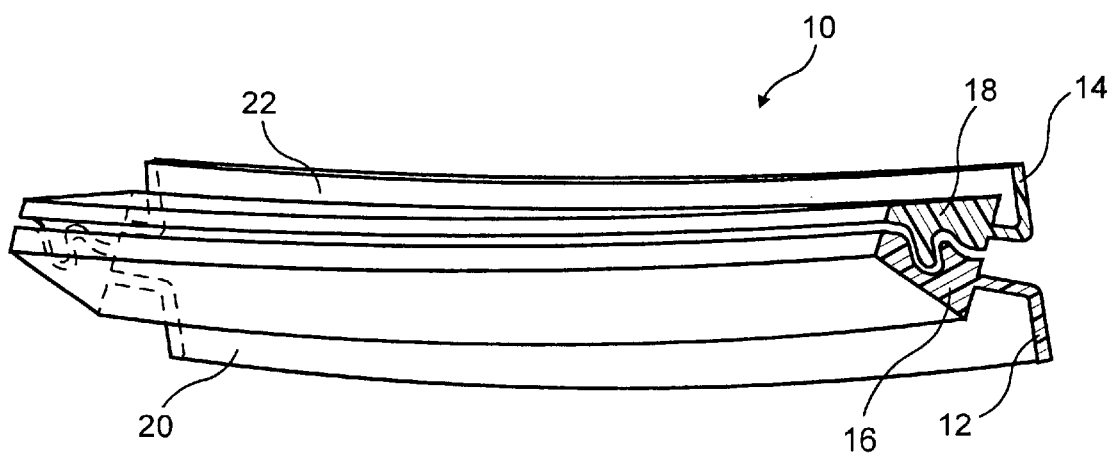
F I G. 4

METHOD OF TREATING ZIPPER TO REMOVE CAMBER

BACKGROUND OF THE INVENTION

The present invention relates to reclosable packaging and, in particular to a method for treating zipper used in the production of such packaging to remove camber from the zipper.

Reclosable packaging is becoming increasingly more popular as primary packaging for food stuffs and other commodities. One reason for the growing popularity of such packaging is the development of form, fill and seal (FFS) equipment which lends itself to rapid and mass production of packages with advanced features, such as reclosability combined with hermetic sealing and tamper evidence. A common form of FFS equipment feeds a length of zipper from a spool, applies the zipper length transversely across a bag film and then feeds the film and applied zipper over a forming collar and about a fill tube to form and ultimately fill the bag.

A problem that has been encountered in such operations is that the zipper when spooled tends to develop curvature or camber. This is caused by the difference in diameter between the interlocking profiles when wound around the core of a spool. The lower profile or the profile closest to the core has a smaller diameter than the engaged profile above it. This difference is more acute at the locations closests to the core. Even after the zipper is attached to the film, the camber remains, particularly when the film is relatively flexible. This causes alignment and other problems in the production process and could lead to an unsightly and sometimes unworkable package.

SUMMARY OF THE INVENTION

In view of the above, a principal object of the present invention is to provide a method of treating zipper to remove such camber in the zipper.

A further object is to provide such a method that can be practiced at any point in the production of the reclosable packaging but preferably after the formed zipper is un-spooled but before it is sealed in place.

Still another object is to provide such a process that employs relatively simple equipment to remove camber that results from the zipper spooling.

Accordingly, in accordance with the present invention, camber is removed from a spool wound zipper, by stretching the zipper longitudinally around a curved surface so the interlocking elements are stretched relative to each other. Generally the zipper interlocking elements are stretched against a surface that is in a plane of about 90 degrees to the direction in which the elements interlock. In other instances to further help remove the camber, the zipper may be driven around the curved surface in a direction opposite to that in which it had been wound on the spool. To this end, a set of drive rolls drives a zipper that was wound on a spool past a curved surface, with the zipper fitting into a groove in the curved surface shaped to accommodate it. A set of guide rollers maintain pressure on the zipper and hold it in position. Alternately the zipper is fed to an idler wheel from a set of first drive wheels and fed from the idler wheel by a set of second drive wheels. The second drive wheels are driven faster than the first drive wheels to effect the stretching. The idler wheel can be spring loaded with a calibrated spring to add additional stretch to the zipper. Alternately only the second set of wheels are used to drive the zipper, with the spring loaded idler wheel providing the required stretch. The rim of the idler wheel has a center channel in which the profiles' interlocking members ride and the center channel has sides that will accommodate the zipper shape.

BRIEF DESCRIPTION OF THE DRAWING

In the accompanying drawings:

FIG. 3 is an enlarged side elevational view of the profile section of one of the set of drive wheels for a zipper with tapered sides;

FIG. 4 is a side elevational of a length of zipper prior to the camber being removed;

DETAILED DESCRIPTION OF THE PREFERRED EMBODIMENT

Reference is now made to the drawings and to FIG. 4 in particular wherein a length of zipper as used in the formation of reclosable plastic bags is depicted. While such zipper may take on many shapes and configurations, the representative zipper depicted consists of two profiles 12, 14 with each profile consisting of an interlocking element 16, 18 and a web 20, 22. Many variations are well known in the art for such profiles such as the shapes of the interlocking elements, and the number and position of the webs. What is common to the various types of profiles is that the interlocking elements of each set of profiles are designed to engage and disengage with each other. In addition, where the zippers are provided with webs, the mass of the interlocking elements is substantially greater (on the order of ten times more) than the mass of the profile webs.

Figure 5:
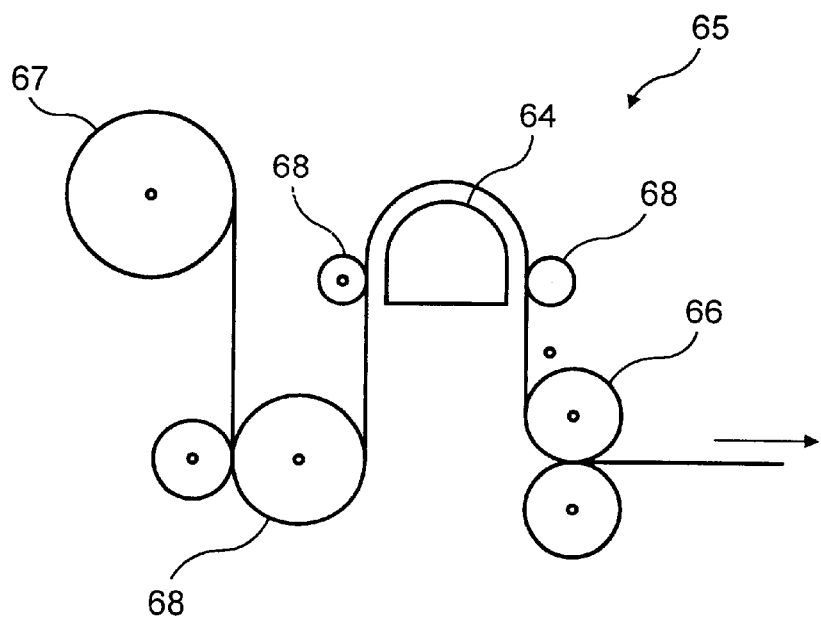
FIG. 5 is a top plan view of an alternate device.

A device 64 for removing such camber is depicted in FIG. 5. A curved surface 64 is provided with the zipper being driven around it by rolls 66. The zipper is fed from a spool 67 and is held in place by guide rolls 68. The curved surface 64 is provided with a groove such as depicted in FIG. 3, formed to accommodate the zipper shape. As the zipper is driven around the curved surface, one interlocking element of the zipper is stretched relative to the other.

Figure 2:
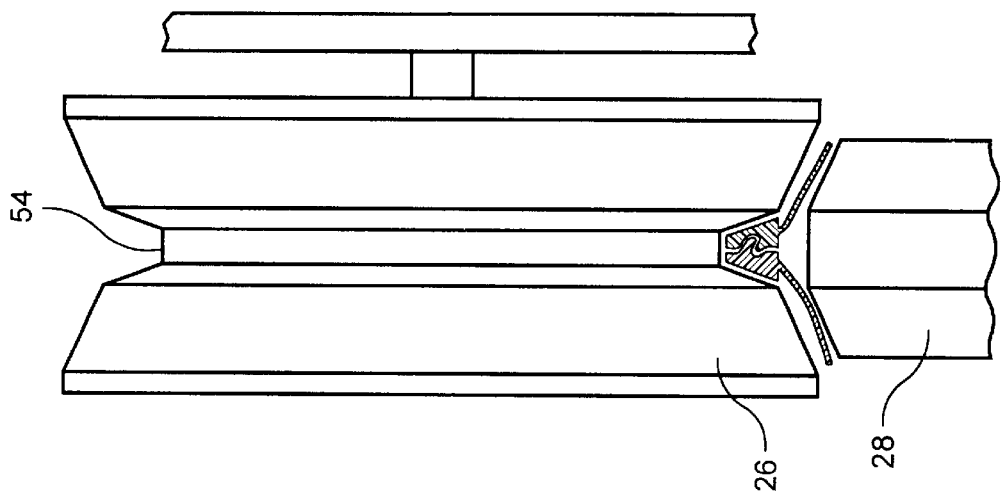
FIG. 2 is an enlarged side elevational view of one of the first set of drive wheels.
Figure 1:
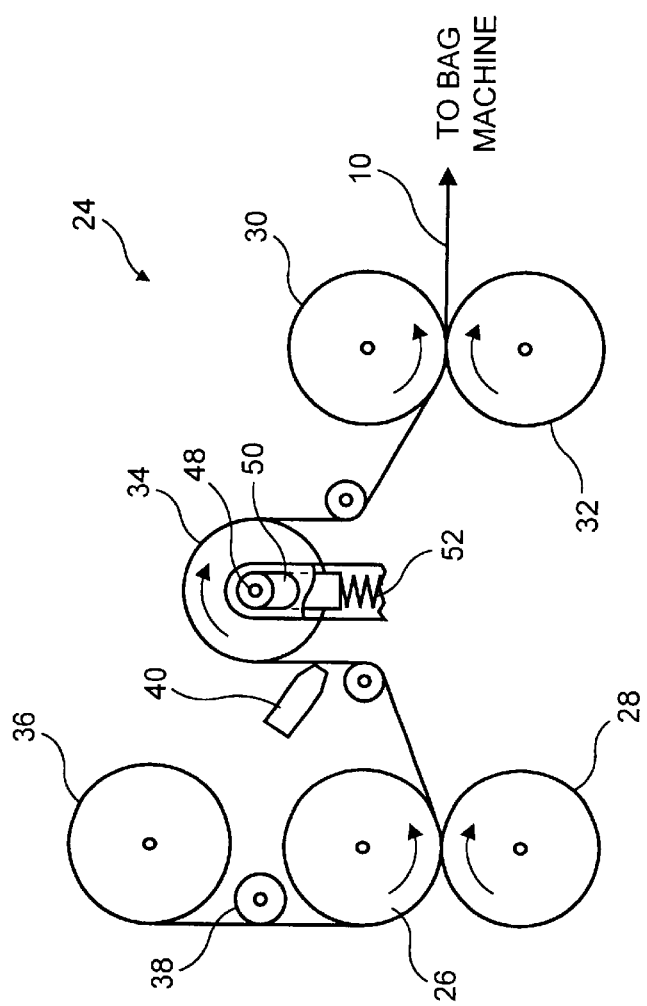
FIG. 1 is a top schematic view of a device for removing camber in accordance with the present invention.

In another arrangement, a device 24 for removing such camber is depicted in FIG. 1. The device consists of a first set of drive wheels 26, 28 a second set of drive wheels 30, 32 and a spring loaded idler wheel 34. The zipper 10 is fed from a spool 36 past guide 38 to the first set of drive wheels 26, 28. The zipper then passes around the idler wheel 34 to the second set of drive wheels 30, 32. The second set of drive wheels 30, 32 is driven at a slightly greater speed than the first set of drive wheels 26, 28. As a result the zipper 10 is maintained in tension and stretched as it passes over the idler wheel 34. Alternately, only the second set of drive wheels drive the zipper past the spring loaded idler wheel, with the spring calibrated to provide the amount of stretch required to remove the camber.

A heater 40 may be provided upstream of the idler wheel to soften the zipper before it passes around the idler wheel and thereby facilitate the stretching to which the zipper will be subjected. By stretching one interlocking profile relative to the other around idler wheel 34 the camber in the zipper is removed. A groove 42 is provided in the rim of the various wheels configured to the zipper shape to capture the zipper interlocking element 16, 18. The grooves may vary in shape according to their function. In this instance the rim also tapers outwardly on both sides of the groove to provide support 44, 46 for the webs 20 and 22 of the zipper. The idler wheel shaft 48 rides in a slot 50 in a frame of the device and is biased by a spring 52. As a result, constant or additional tension can be maintained or added on the zipper as it passes around the idler wheel that tends to longitudinally stretch the profiles interlocking members relative to each other. The groove provided in the feed-in drive wheels 26, 28, the feed-off drive wheels 30, 32 and the spring loaded idler wheel 34 are depicted in FIG. 3. As shown the rims of the drive wheels and idler wheels are flat or tapered depending on the zipper construction, except for a groove 54 for the interlocking members.

Figure 6:
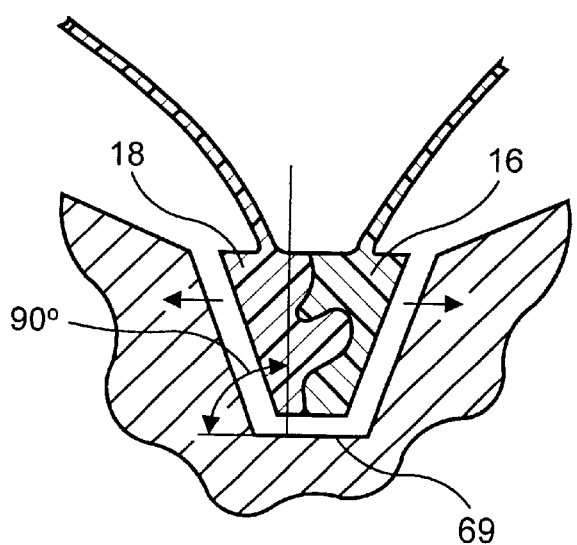
FIG. 6 is a fragmentary and enlarged sectional view of the profile groove.

As is depicted in FIG. 6 the interlocking elements 16 and 18, open and close in the direction shown by the arrows and this direction is at right angles to the stretching direction being applied to the elements as they ride around the curved surface 69.

By stretching the interlocking member of the zipper relative to each other the camber is removed from the zipper. The camber removal device is best placed immediately upstream of the bag making equipment so as to remove any camber that will have built up in the zipper as a result of being spooled.

Having thus described the invention, what is claimed is:

1. A method of treating zipper having mated interlocking members and at least one web on each side of said mated interlocking members to remove camber in the zipper, said method comprising stretching the mated interlocking members relative to each other.

2. A method in accordance with claim 1 wherein the interlocking members are stretched around a curved surface.

3. A method in accordance with claim 1 wherein the direction in which said elements are interlocked is generally at 90 degrees to a stretching direction.

4. A method in accordance with claim 1 wherein the direction of stretching the zipper is opposite to a direction in which the zipper was wound on said spool.

5. A method of treating zipper to remove camber in the zipper comprising the steps of:

feeding a length of said zipper from a spool at a first speed to an idler roller;

passing said zipper around said idler roller; and then feeding the zipper at a second speed from said idler roller, said second speed being greater than said first speed so as to stretch one interlocking member of said zipper relative to another interlocking member of the zipper.

6. A method in accordance with claim 5 wherein said idler roller has contoured to outside dimensions of said interlocking members.

7. A method in accordance with claim 5 comprising the further step of tensioning said idler roller as said zipper passes around it.

8. The method in accordance with claim 5 comprising the further step of heating said zipper prior to passing said zipper around said idler roller.

9. The method in accordance with claim 1 comprising the further step of heating said zipper prior stretching the mated interlocking members relative to each other.

10. A method of treating zipper to remove camber in the zipper compromising the steps of, feeding a length of zipper from a spool to an idler roller, passing said zipper around said idler roller, spring loading said idler roller, feeding said zipper to a second set of rollers and driving said second set of rollers so as to stretch one interlocking member relative to the other.

* * * * *